US012668467B2

(12) United States Patent
Hira et al.

(10) Patent No.: US 12,668,467 B2
(45) Date of Patent: Jun. 30, 2026

(54) CARGO HANDLING SYSTEM AND UNMANNED CARRIER

(71) Applicant: Mitsubishi Logisnext Co., Ltd., Kyoto (JP)

(72) Inventors: Yuki Hira, Kyoto (JP); Fumiyuki Shima, Kyoto (JP); Takuya Kitamura, Kyoto (JP); Kei Nagamura, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 391 days.

(21) Appl. No.: 18/446,483

(22) Filed: Aug. 9, 2023

(65) Prior Publication Data

US 2024/0327179 A1 Oct. 3, 2024

(30) Foreign Application Priority Data

Mar. 29, 2023 (JP) ................................ 2023-052503

(51) Int. Cl.
*G05D 1/646* (2024.01)
*B66F 9/06* (2006.01)
*B66F 9/075* (2006.01)

(52) U.S. Cl.
CPC ............ *B66F 9/063* (2013.01); *B66F 9/0755* (2013.01)

(58) Field of Classification Search
CPC .......... B66F 9/063; B66F 9/0755; B66F 9/06; B65G 67/04
See application file for complete search history.

(56) References Cited

U.S. PATENT DOCUMENTS

| | | | | |
|---|---|---|---|---|
| 2018/0329426 | A1* | 11/2018 | Gupta | G05D 1/0297 |
| 2020/0299117 | A1* | 9/2020 | Sperlich | B66F 9/0755 |
| 2022/0297992 | A1* | 9/2022 | Sonoura | G05D 1/667 |
| 2022/0390955 | A1* | 12/2022 | McLachlan | G05D 1/024 |
| 2022/0396459 | A1* | 12/2022 | Kim | B66F 9/0755 |
| 2022/0402733 | A1* | 12/2022 | Kim | B66F 9/063 |
| 2023/0068916 | A1* | 3/2023 | Mita | G05D 1/0248 |

FOREIGN PATENT DOCUMENTS

| | | |
|---|---|---|
| CN | 114572719 | 6/2022 |
| JP | 2001097249 | 4/2001 |
| JP | 2019189463 | 10/2019 |
| JP | 2022060619 | 4/2022 |
| JP | 2022060619 A * | 4/2022 |
| JP | 2022138865 | 9/2022 |
| JP | 2022138865 A * | 9/2022 |

OTHER PUBLICATIONS

"Search Report of Europe Counterpart Application", issued on Jan. 10, 2024, pp. 1-12.

* cited by examiner

*Primary Examiner* — Saul Rodriguez
*Assistant Examiner* — Jaimin G Patel
(74) *Attorney, Agent, or Firm* — JCIPRNET

(57) ABSTRACT

A cargo handling system includes a truck stop area, a truck that stops within the truck stop area, and an unmanned carrier. The unmanned carrier includes a second cargo bed, a first laser sensor and a travel control part, and is configured to stop adjacent to the truck. The first laser sensor irradiates a laser obliquely rearward in a horizontal direction toward the truck and detects a side surface of a front panel or a side surface of a rear panel. The travel control part causes the unmanned carrier to stop when the side surface of the front panel or the side surface of the rear panel is detected.

6 Claims, 8 Drawing Sheets

CARGO HANDLING SYSTEM AND UNMANNED CARRIER

CROSS-REFERENCE TO RELATED APPLICATIONS

This application claims the priority benefit of Japan Application No. 2023-052503, filed on Mar. 29, 2023. The entirety of the above-mentioned patent application is hereby incorporated by reference herein and made a part of this specification.

BACKGROUND

Technical Field

The disclosure relates to a cargo handling system and an unmanned carrier used in the cargo handling system.

Related Art

Conventionally, there has been an unmanned carrier that transports cargo shipped from an automated warehouse, as disclosed in Japanese Patent Laid-open No. 2019-189463. As a cargo handling system using an unmanned carrier 110 of this kind, as illustrated in FIG. 8, there is a system 100 which further includes a wing-body truck 1 (see, for example, Japanese Patent Laid-open No. 2001-097249) and a manned carrier 4.

This system is configured so that: (1) the wing-body truck 1 is put on standby in advance within a predetermined area E; (2) the unmanned carrier 110 in a state loaded with shipped cargo W transports the cargo W to the wing-body truck 1, stops adjacent to a first cargo bed 10 of the wing-body truck 1 and is on standby; (3) when the manned carrier 4 picks up the cargo W from the unmanned carrier 110, the unmanned carrier 110 leaves a standby position, and the manned carrier 4 loads the first cargo bed 10 of the wing-body truck 1 with the cargo W; and (4) the operations of (2) and (3) are repeated until the first cargo bed 10 of the wing-body truck 1 is filled.

In this kind of system, it is preferable to load cargo leaving as little space as possible from an end of the cargo bed of the truck. For that purpose, the cargo needs to be loaded at a predetermined position of the cargo bed. If the standby position of the unmanned carrier is appropriate, as illustrated in FIG. 8, after picking up the cargo W, the manned carrier 4 is able to load the cargo onto a predetermined loading position simply by moving forward without adjusting its position in the left-right direction.

However, since the truck does not always stop at the same position within the area, and the length of the cargo bed differs depending on the type of truck, it has been difficult to cause the unmanned carrier to stop and stand by at an appropriate position.

SUMMARY

A cargo handling system according to the disclosure includes: a truck stop area; a truck, including a first cargo bed and at least one of a front panel and a rear panel, stopping within the truck stop area; and an unmanned carrier, including a second cargo bed, a first laser sensor and a travel control part, configured to stop adjacent to the truck. The first laser sensor irradiates a laser obliquely rearward in a horizontal direction toward the truck and detects a side surface of the front panel or a side surface of the rear panel. The travel control part causes the unmanned carrier to stop when the side surface of the front panel or the side surface of the rear panel is detected.

An unmanned carrier according to the disclosure is an unmanned carrier used in a cargo handling system. The cargo handling system includes: a truck stop area; and a truck, including a first cargo bed and at least one of a front panel and a rear panel, stopping within the truck stop area. The unmanned carrier is configured to stop adjacent to the truck, and includes a second cargo bed, a first laser sensor and a travel control part. The first laser sensor irradiates a laser obliquely rearward in a horizontal direction toward the truck and detects a side surface of the front panel or a side surface of the rear panel. The travel control part causes the unmanned carrier to stop when the side surface of the front panel or the side surface of the rear panel is detected.

DESCRIPTION OF THE EMBODIMENTS

Figure 1:
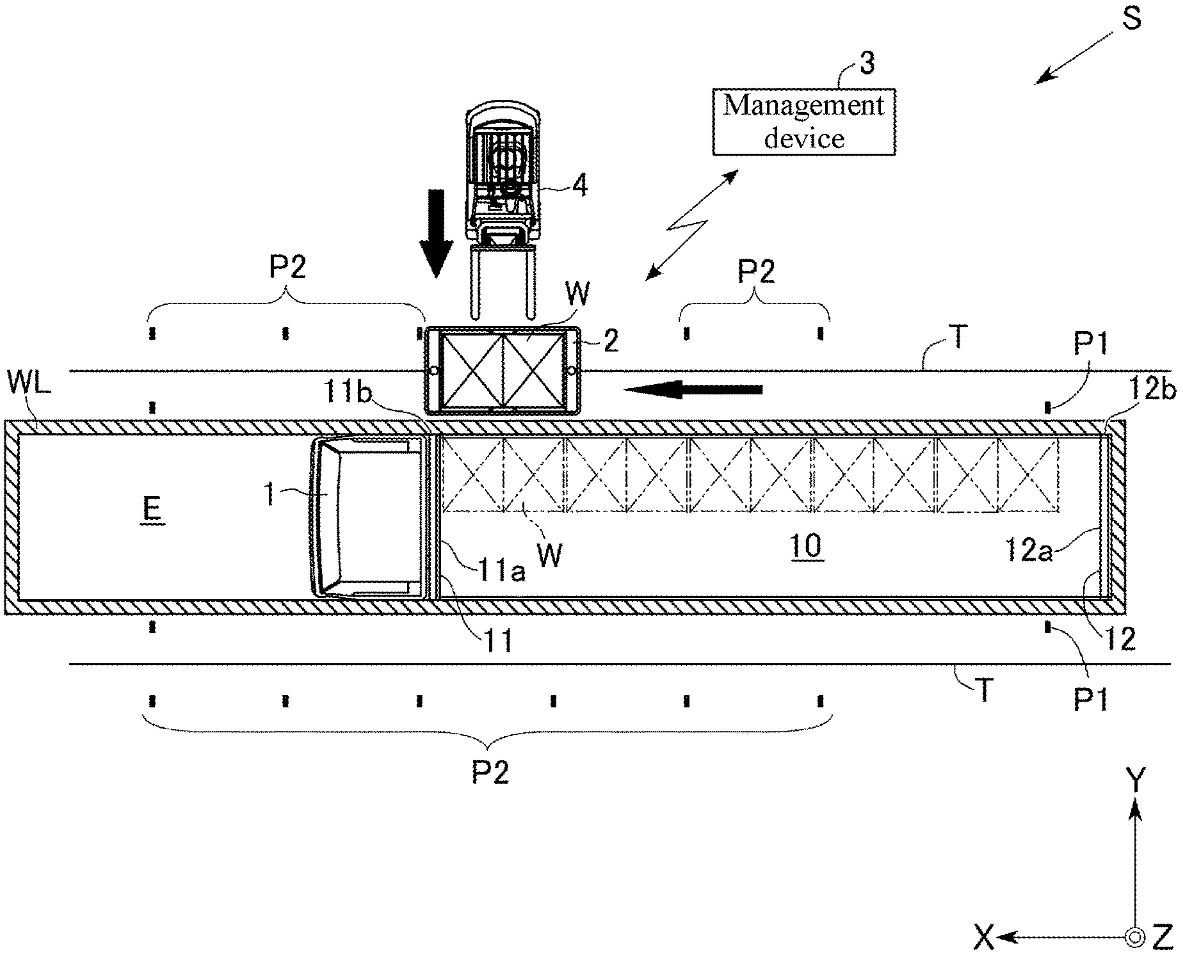
FIG. 1 is an overall view of a cargo handling system according to one embodiment of the disclosure.

The disclosure provides a cargo handling system and an unmanned carrier used in the cargo handling system, in which the unmanned carrier can be stopped at a preferred position adjacent to a truck even if a stop position of the truck within a predetermined area is different each time.

A cargo handling system according to the disclosure includes: a truck stop area; a truck, including a first cargo bed and at least one of a front panel and a rear panel, stopping within the truck stop area; and an unmanned carrier, including a second cargo bed, a first laser sensor and a travel control part, configured to stop adjacent to the truck. The first laser sensor irradiates a laser obliquely rearward in a horizontal direction toward the truck and detects a side surface of the front panel or a side surface of the rear panel. The travel control part causes the unmanned carrier to stop when the side surface of the front panel or the side surface of the rear panel is detected.

Preferably, in the cargo handling system, the first laser sensor is arranged in a front portion of the unmanned carrier.

Preferably, in the cargo handling system, the unmanned carrier includes a plurality of the first laser sensors. Each of the first laser sensors is arranged in each of a front portion and a rear portion of the unmanned carrier.

In the cargo handling system, the truck is, for example, a wing-body truck, and the first laser sensor is configured to detect the side surface of the front panel of the wing-body truck.

Preferably, in the cargo handling system, the unmanned carrier further includes a second laser sensor. The second laser sensor irradiates a laser obliquely forward in the horizontal direction toward the truck and detects a distance from a rear surface of the front panel or a distance from a front surface of the rear panel. When the distance between the second laser sensor and the rear surface of the front panel or the front surface of the rear panel reaches a predetermined distance, the travel control part reduces a traveling speed of the unmanned carrier.

Preferably, the cargo handling system further includes: a distance measurement start point, arranged laterally adjacent to the truck in a length direction of the truck; a distance output part, configured to output a distance traveled by the unmanned carrier from a position of the distance measurement start point, outputting a first distance from the position of the distance measurement start point to a position where the side surface of the front panel or the side surface of the rear panel is detected and the unmanned carrier stops; a storage part, storing a length of cargo to be transported and a predetermined second distance between each cargo; and a distance calculator, based on the first distance, the length of the cargo to be transported and the second distance, calculating a third distance from the position of the distance measurement start point to where the next unmanned carrier stops adjacent to the truck. Based on the third distance calculated by the distance calculator and the distance outputted by the distance output part, the travel control part causes the unmanned carrier to stop.

An unmanned carrier according to the disclosure is an unmanned carrier used in a cargo handling system. The cargo handling system includes: a truck stop area; and a truck, including a first cargo bed and at least one of a front panel and a rear panel, stopping within the truck stop area. The unmanned carrier is configured to stop adjacent to the truck, and includes a second cargo bed, a first laser sensor and a travel control part. The first laser sensor irradiates a laser obliquely rearward in a horizontal direction toward the truck and detects a side surface of the front panel or a side surface of the rear panel. The travel control part causes the unmanned carrier to stop when the side surface of the front panel or the side surface of the rear panel is detected.

In the cargo handling system according to the disclosure, the unmanned carrier can be stopped at a preferred position adjacent to the truck even if a stop position of the truck within a predetermined area is different each time.

Hereinafter, one embodiment of a cargo handling system and an unmanned carrier used in the cargo handling system according to the disclosure will be described with reference to accompanying drawings. In the drawings, arrow X indicates a traveling direction of the unmanned carrier, arrow Y indicates a left-right direction, and arrow Z indicates an up-down direction.

FIG. 1 is an overall view of a cargo handling system S according to the present embodiment. As illustrated in FIG. 1, the cargo handling system S includes a truck stop area E, a wing-body truck 1, an unmanned carrier 2, a management device 3, and a manned carrier 4. First, each configuration of the cargo handling system S is described.

<Truck Stop Area>

As illustrated in FIG. 1, the truck stop area E is an area surrounded by a white line WL and has a size that allows the truck (wing-body truck) 1 to stop therein. Outside the white line WL in the left-right direction, a magnetic bar T for guiding the unmanned carrier 2 is provided along the X direction. Furthermore, a distance measurement start point P1 is provided inside the magnetic bars T on the left and right, and a plurality of distance correction points P2 are provided at predetermined intervals in the X direction outside the magnetic bars T on the left and right. The distance measurement start point P1 and the distance correction point P2 are composed of magnetic bars.

<Wing-Body Truck>

The wing-body truck 1 stops in the truck stop area E, facing the left side of FIG. 1. The wing-body truck 1 corresponds to a "truck" of the disclosure. The wing-body truck 1 includes a first cargo bed 10, a front panel 11, a rear panel 12, and wing side panels (not illustrated) on the left and right.

<Unmanned Carrier>

Figure 2:
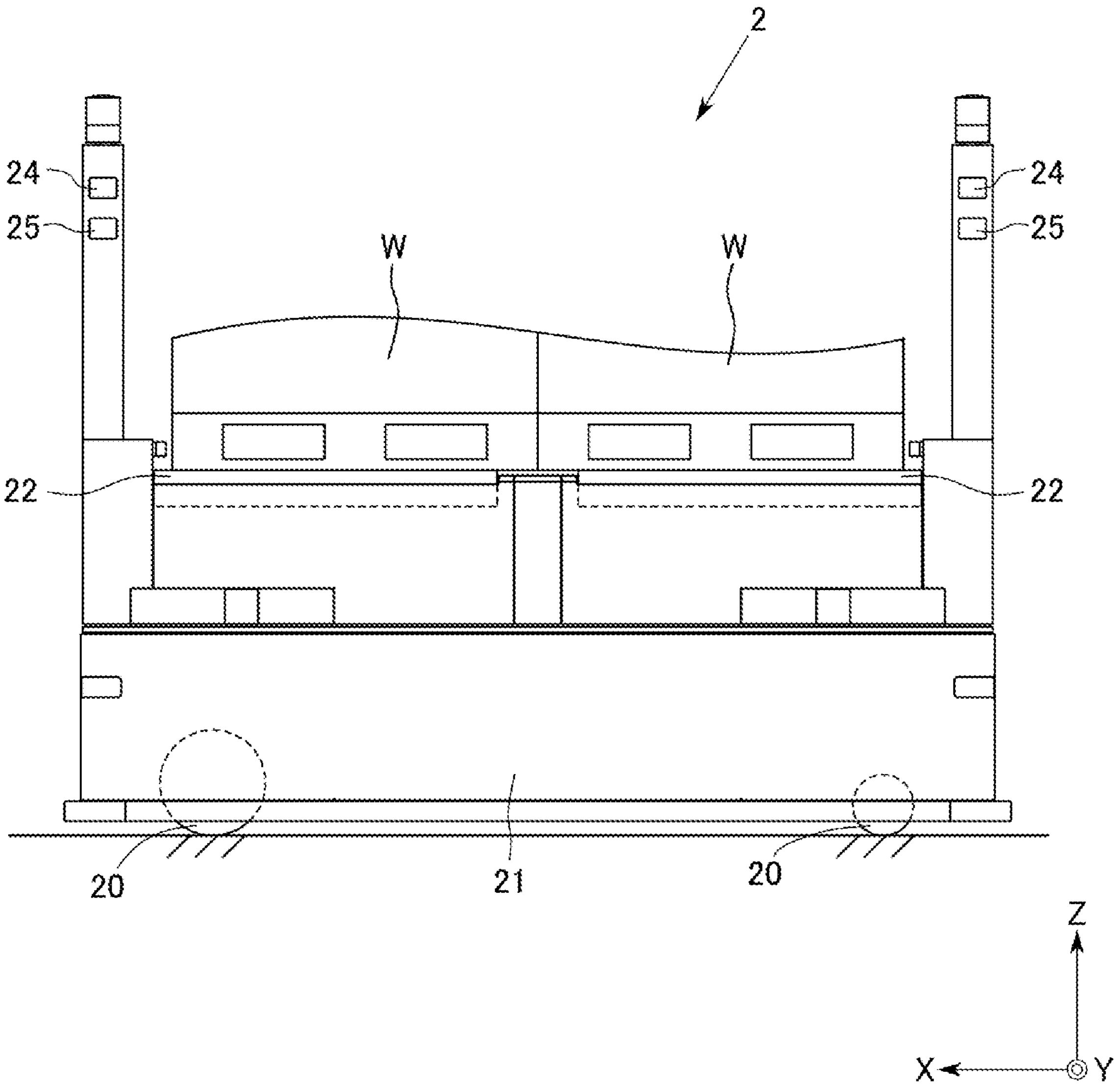
FIG. 2 is a side view of an unmanned carrier illustrated in FIG. 1.
Figure 3:
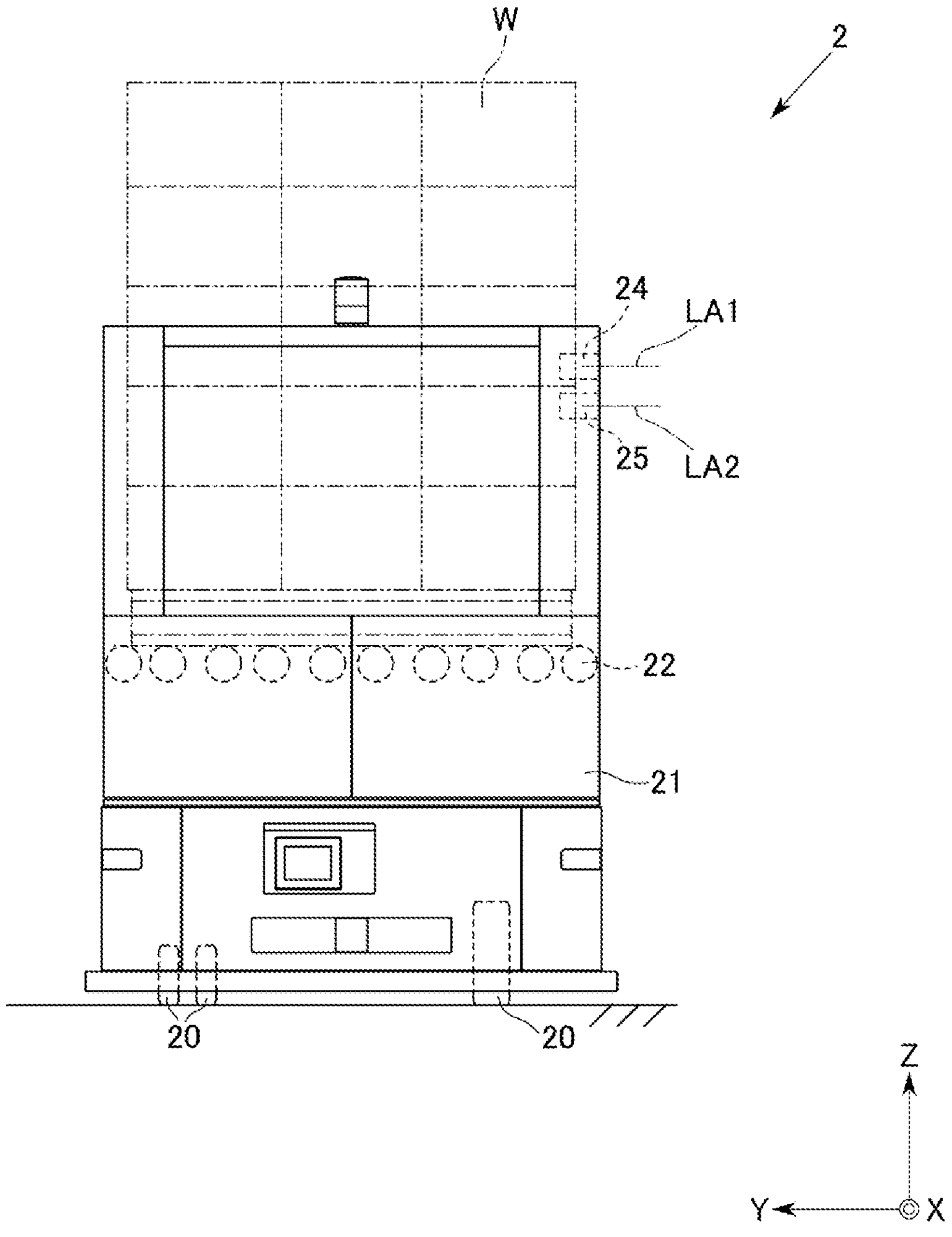
FIG. 3 is a front view of the unmanned carrier illustrated in FIG. 1.
Figure 4:
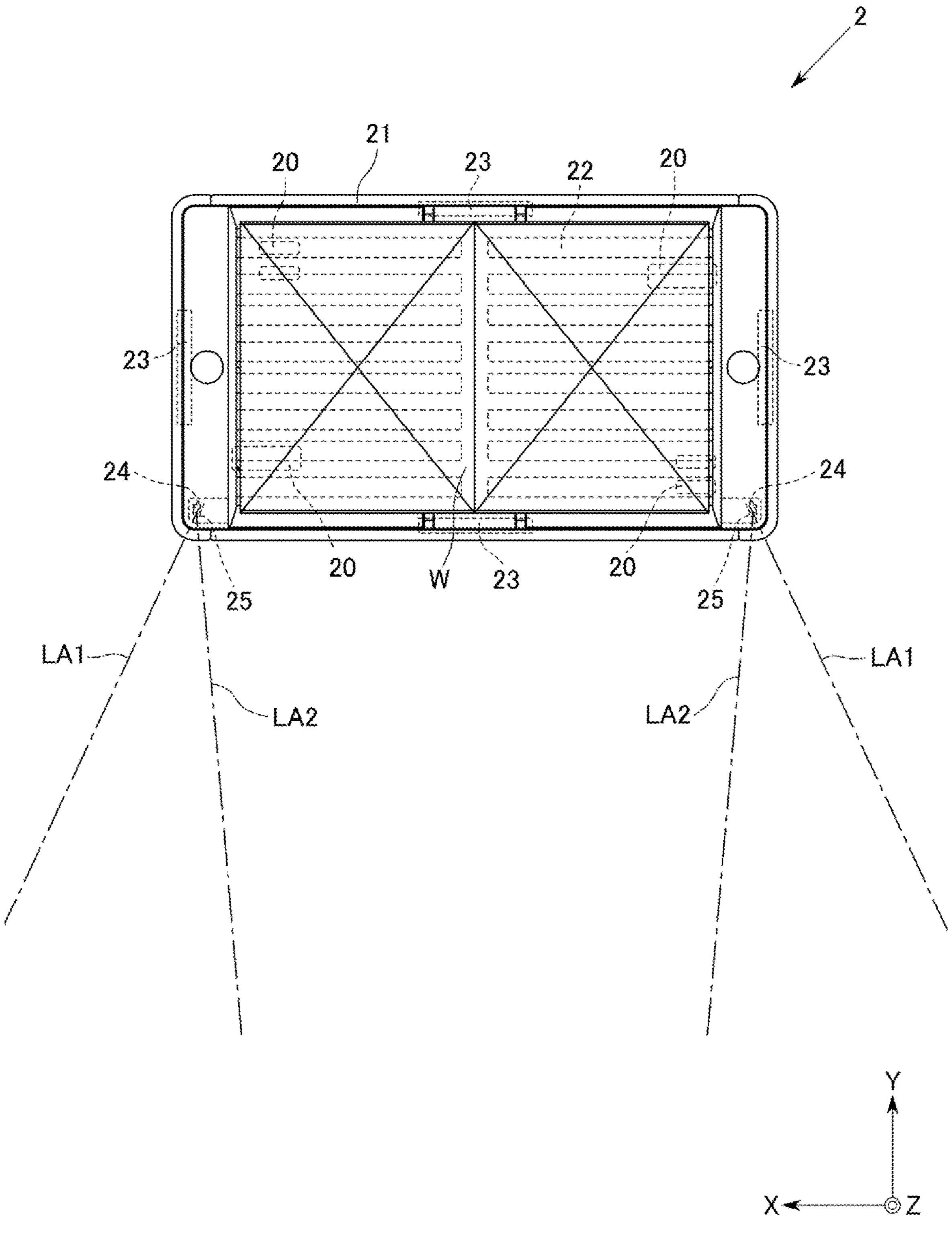
FIG. 4 is a plan view of the unmanned carrier illustrated in FIG. 1.
Figure 5:
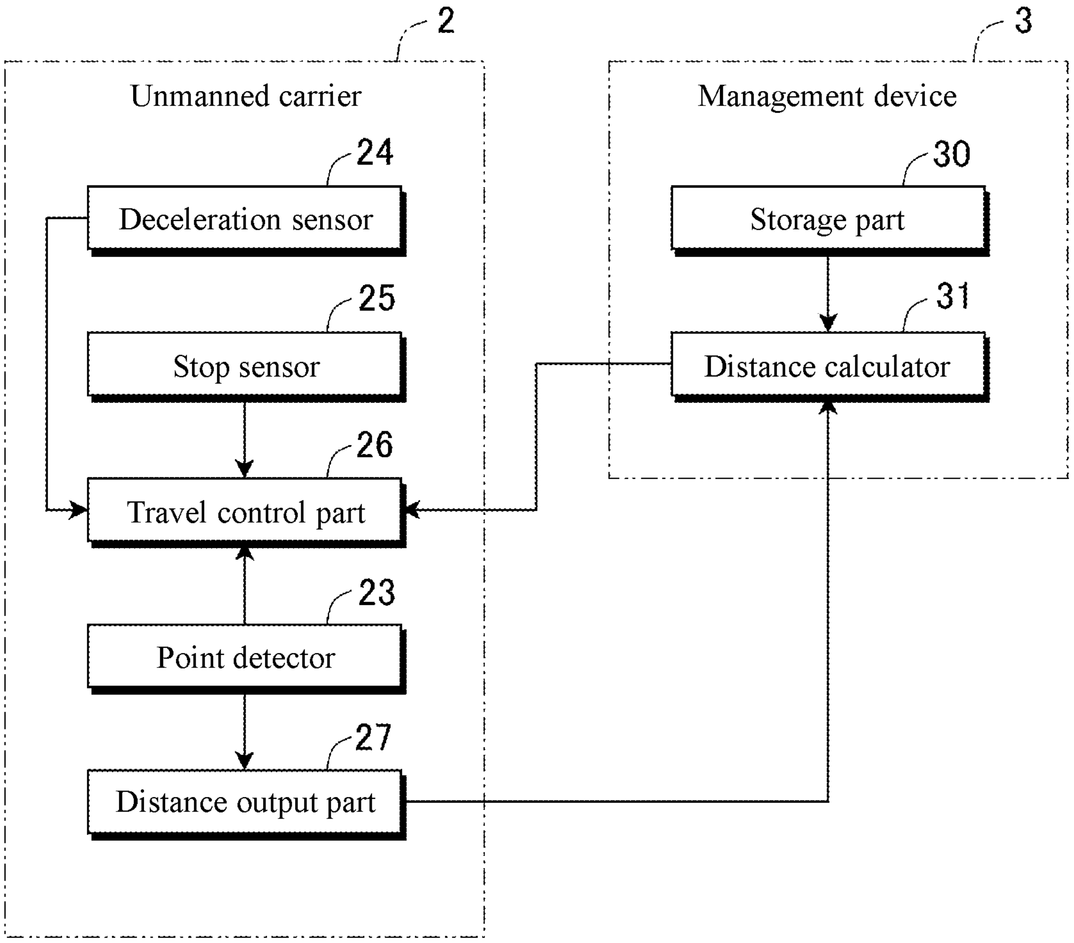
FIG. 5 is a block diagram of a carrier stopping system.

FIG. 2 to FIG. 4 respectively illustrate a side surface, a front surface and a plan of the unmanned carrier 2. FIG. 5 is a block diagram of the unmanned carrier 2 and the management device 3. As illustrated in FIG. 2 to FIG. 5, the unmanned carrier 2 includes a wheel 20, a vehicle body 21, a second cargo bed 22, four point detectors 23, two deceleration sensors 24, two stop sensors 25, a travel control part 26, and a distance output part 27. The deceleration sensor 24 corresponds to a "second laser sensor" of the disclosure, and the stop sensor 25 corresponds to a "first laser sensor" of the disclosure. The unmanned carrier 2 is configured to be able to travel in both forward and rearward directions.

The vehicle body 21 is arranged on the wheel 20 provided on four sides, and the second cargo bed 22 is arranged on an upper surface of the vehicle body 21. The second cargo bed 22 is composed of a conveyor roller. Accordingly, the unmanned carrier 2 is able to receive cargo W shipped from an automated warehouse.

As illustrated in FIG. 4, the four point detectors 23 are provided one at each of a front end and a rear end of the back side of the vehicle body 21 in the traveling direction and one at each of a left end and a right end of the back side of the vehicle body 21. The two point detectors 23 provided in the traveling direction are configured to detect the magnetic bar T. As illustrated in FIG. 1, when the unmanned carrier 2 travels on the right side of the wing-body truck 1, the point detector 23 at the left end is configured to detect the distance measurement start point P1, and the point detector 23 at the right end is configured to detect the distance correction point P2.

When traveling on the left side of the wing-body truck 1, the unmanned carrier 2 travels with a front-rear orientation reversed from that when it travels on the right side of the wing-body truck 1. Accordingly, when the unmanned carrier 2 travels on the left side of the wing-body truck 1, the point detector 23 at the left end also detects the distance measurement start point P1, and the point detector 23 at the right end also detects the distance correction point P2.

Figure 6A:
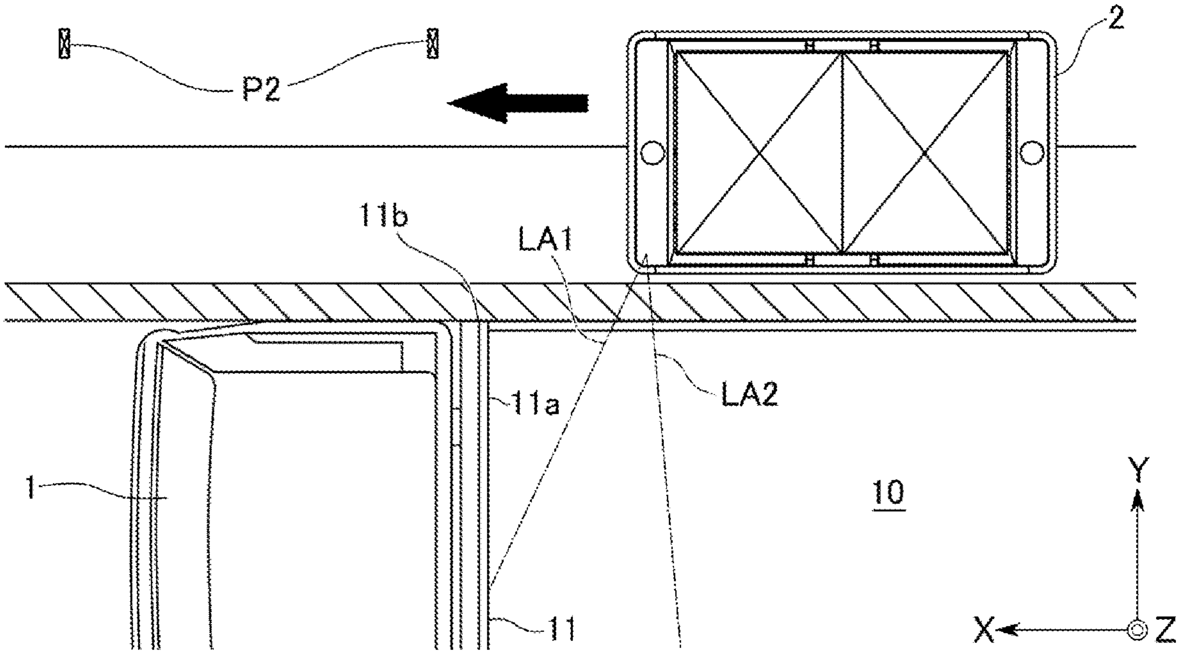
FIG. 6A and FIG. 6B illustrate deceleration and stopping operations of an unmanned carrier.

The two deceleration sensors 24 are composed of laser sensors. As illustrated in FIG. 2 and FIG. 3, the two deceleration sensors 24 are respectively provided above the left side of a front portion of the vehicle body 21 and above the left side of a rear portion of the vehicle body 21. As illustrated in FIG. 4 and FIG. 6A, the deceleration sensor 24 on the front side is configured to, when the unmanned carrier 2 travels on the right side of the wing-body truck 1, irradiate a laser obliquely forward in a horizontal direction toward the wing-body truck 1 so as to detect a distance from a rear surface 11*a* of the front panel 11. An irradiation angle of the laser of the deceleration sensor 24 is adjusted so that the unmanned carrier 2 decelerates from a position a predetermined distance away from a predetermined stop position of the unmanned carrier 2 with respect to the front panel 11. The predetermined distance may be, for example, 500 mm to 900 mm. The irradiation angle of the laser of the deceleration sensor 24 may be inclined by 10° to 80°, preferably by 50° to 70°, with respect to the traveling direction of the unmanned carrier 2.

Since the deceleration sensor 24 on the rear side is located at the head of the unmanned carrier 2 when the unmanned carrier 2 travels on the left side of the wing-body truck 1, the deceleration sensor 24 on the rear side is configured to irradiate a laser obliquely forward in the horizontal direction toward the wing-body truck 1 so as to detect a distance from the rear surface 11*a* of the front panel 11.

In this way, by including the deceleration sensors 24 on the front and rear, the unmanned carrier 2 is able to detect the distance from the rear surface 11*a* of the front panel 11 when traveling either on the right side or the left side of the wing-body truck 1.

The two stop sensors 25 are composed of laser sensors. As illustrated in FIG. 2 and FIG. 3, the two stop sensors 25 are respectively provided below the deceleration sensors 24.

Figure 6B:
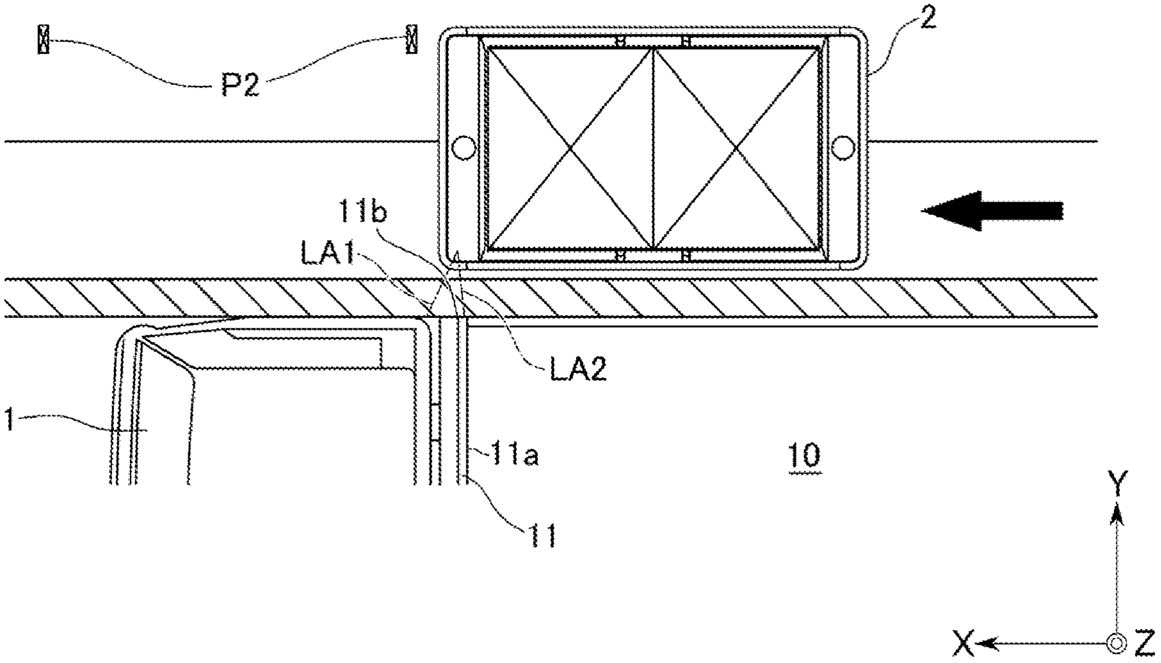

As illustrated in FIG. 4 and FIG. 6B, the stop sensor 25 on the front side is configured to, when the unmanned carrier 2 travels on the right side of the wing-body truck 1, irradiate a laser obliquely rearward in the horizontal direction toward the wing-body truck 1 so as to detect a side surface 11*b* on the right side of the front panel 11. The irradiation angle of the laser of the stop sensor 25 may be inclined by 96° to 105°, preferably by 98° to 100°, with respect to the traveling direction of the unmanned carrier 2. Since the stop sensor 25 irradiates the laser obliquely rearward with respect to a forward direction, even if the wing-body truck 1 may stop while tilting left and right with respect to the white lines WL on the left and right, there is no erroneous detection of the side surface 11*b* of the front panel 11.

The stop sensor 25 on the rear side is configured to, when the unmanned carrier 2 travels on the left side of the wing-body truck 1, irradiate a laser obliquely rearward in the horizontal direction toward the wing-body truck 1 so as to detect the side surface 11*b* on the left side of the front panel 11.

In this way, by including the stop sensors 25 on the front and rear, the unmanned carrier 2 is able to detect the side surface 11*b* of the front panel 11 when traveling either on the right side or the left side of the wing-body truck 1.

The travel control part 26 is configured to rotate or stop the wheel 20 to control travel of the unmanned carrier 2, and causes the unmanned carrier 2 to travel along the magnetic bar T detected by the two point detectors 23 provided in the traveling direction.

When the distance between the rear surface 11*a* of the front panel 11 and the deceleration sensor 24 detected by the deceleration sensor 24 reaches a predetermined distance, the travel control part 26 reduces a traveling speed of the unmanned carrier 2. That is, since the unmanned carrier 2 is able to decelerate based on its distance from the front panel 11 regardless of a stop position of the wing-body truck 1, even if the stop position of the wing-body truck 1 within the truck stop area E is different each time, and even if the type of the wing-body truck 1 is different each time, the unmanned carrier 2 is able to decelerate from a position at a predetermined distance with respect to the front panel 11. As described above, the predetermined distance may be, for example, 500 mm to 900 mm.

Furthermore, the travel control part 26 is configured to, when the side surface 11*b* of the front panel 11 is detected by the stop sensor 25, cause the unmanned carrier 2 to stop after a predetermined distance has been traveled or after a predetermined time has elapsed. That is, since the unmanned carrier 2 is able to stop by detecting the front panel 11 regardless of the stop position of the wing-body truck 1, even if the stop position of the wing-body truck 1 within the truck stop area E is different each time, and even if the type of the wing-body truck 1 is different each time, the unmanned carrier 2 is able to stop at a predetermined position with respect to the front panel 11. After detecting the side surface 11*b* of the front panel 11, the unmanned carrier 2 may travel a distance of, for example, 100 mm to 140 mm, until it is stopped.

As described later, the travel control part 26 is configured to cause the unmanned carrier 2 to stop after the unmanned carrier 2 has traveled a third distance calculated by the distance calculator 31 from the distance measurement start point P1.

In this way, the unmanned carrier 2 that carries the cargo W (hereinafter referred to as "first cargo W") loaded adjacent to the front panel 11 is hereinafter referred to as "first unmanned carrier 2".

The distance output part 27 is a travel encoder and outputs a distance traveled by the unmanned carrier 2 from a position of the distance measurement start point P1. The distance output part 27 outputs a first distance from the position of the distance measurement start point P1 to a position where the side surface 11*b* of the front panel 11 is detected and the unmanned carrier 2 stops. The outputted first distance is transmitted to the management device 3. The distance output part 27 is configured to, by referring to a distance from the distance measurement start point P1 and an outputted distance at each distance correction point P2 detected by the point detector 23, output the first distance while correcting the outputted distance.

<Management Device>

As illustrated in FIG. 5, the management device 3 includes a storage part 30 and the distance calculator 31.

The storage part 30 stores a length of the cargo W to be transported and a predetermined second distance between each cargo W. The second distance between each cargo W is a distance between each cargo W when a plurality of cargos W are loaded on the first cargo bed 10. In the present embodiment, the length of the cargo W to be transported is stored as 1800 mm, and the second distance is stored as 20 mm.

Based on the first distance, the length of the cargo W to be transported, and the second distance, the distance calculator 31 calculates the third distance from the position of the distance measurement start point P1 to where the unmanned carrier 2 (hereinafter referred to as "n-th unmanned carrier 2") that transports the n-th cargo W following the first cargo W stops adjacent to the truck.

For example, when the first distance is 8150 mm, the third distance from the distance measurement start point P1 to where the n-th unmanned carrier 2 stops is calculated by the following equation.

$$\text{Third distance}=8150\text{ mm}-(1800\text{ mm}+20\text{ mm})*(n-1)$$

Accordingly, in the case of the second unmanned carrier 2, the third distance is 6330 mm. The distance calculator 31 transmits the third distance calculated by the equation to the n-th unmanned carrier 2. The distance calculator 31 repeats the above the number of times specified by the management device 3. As described above, the travel control part 26 causes the unmanned carrier 2 to travel, from the distance measurement start point P1, the third distance received from the distance calculator 31 and then stop.

When the specified number of times of transportation to the right side of the first cargo bed 10 of the wing-body truck 1 is completed, the management device 3 may transmit a cargo handling command to the n-th unmanned carrier 2 to transport the cargo W to the opposite side of the wing-body truck 1. Accordingly, the unmanned carrier 2 that has received the cargo handling command transports the cargo W to the opposite side (left side) of the first cargo bed 10 of the wing-body truck 1 while again detecting the distance measurement start point P1 and the rear surface 11*a* and the side surface 11*b* of the front panel 11.

<Manned Carrier>

As illustrated in FIG. 1, the manned carrier 4 is a forklift, and includes a fork and a lifting device capable of lifting and lowering the fork.

The manned carrier 4 picks up the cargo W loaded on the unmanned carrier 2, and, when the unmanned carrier 2 retreats, moves forward and loads the cargo W onto the wing-body truck 1. Since the unmanned carrier 2 is on standby at an appropriate position, the manned carrier 4 is able to, after picking up the cargo W, load the cargo W onto a predetermined loading position simply by moving forward without adjusting its position in the left-right direction.

<Operation of Cargo Handling System>

Next, an operation of the cargo handling system S is described with reference to the flowchart of FIG. 7.

Figure 7:
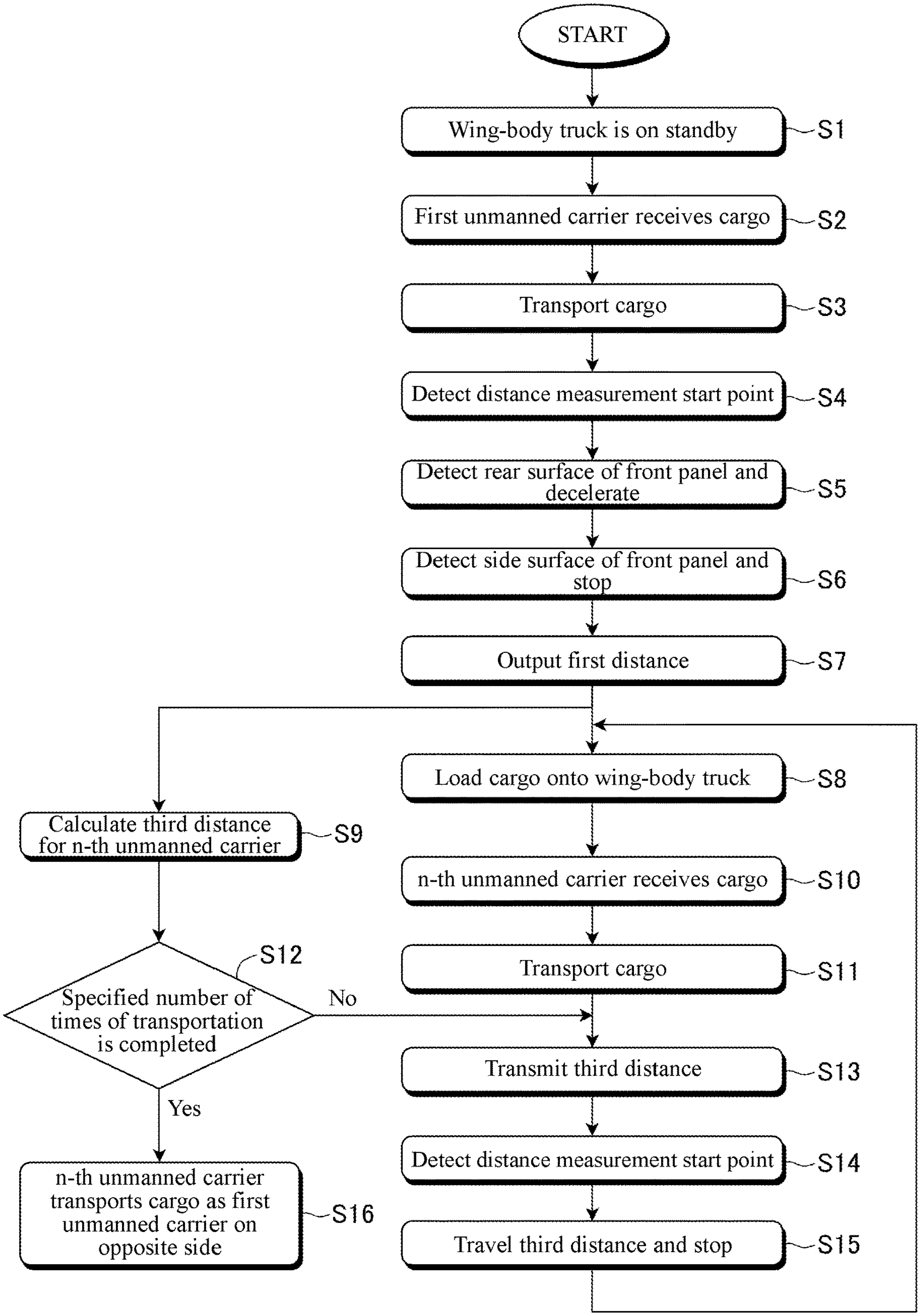
FIG. 7 is a flowchart of the carrier stopping system.
Figure 8:
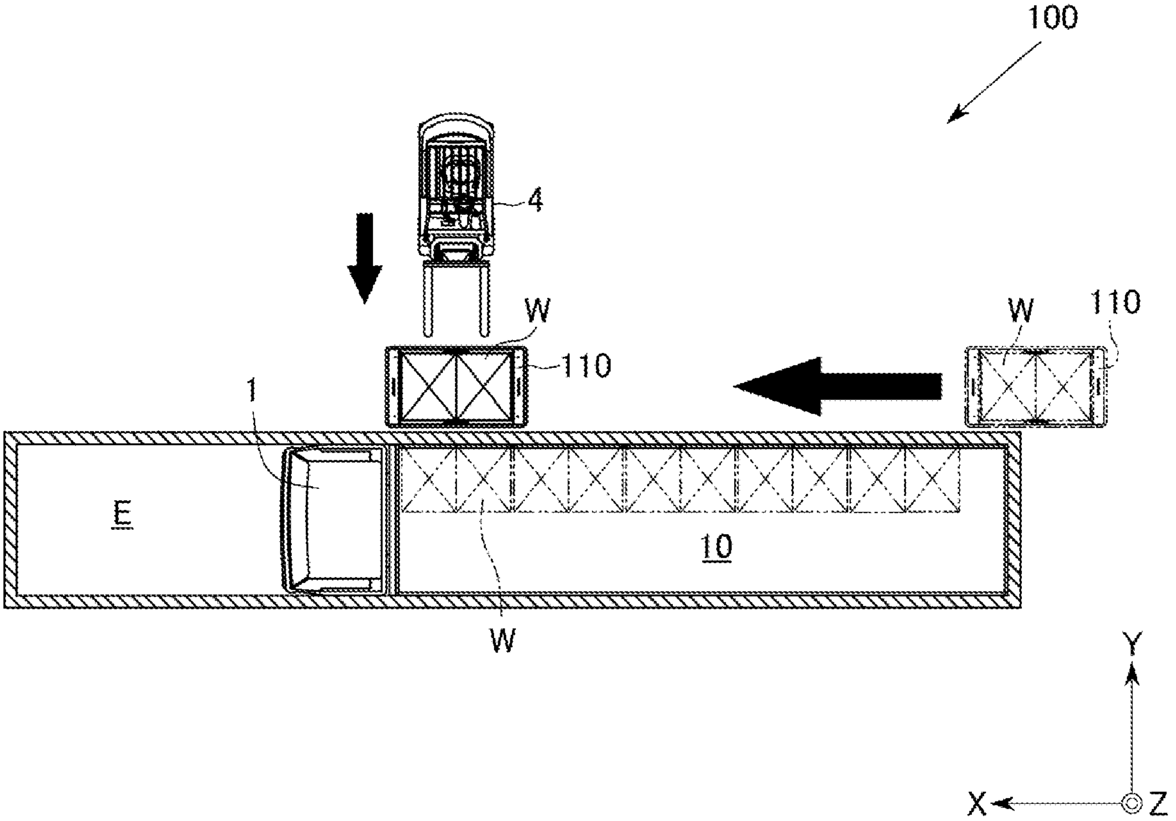
FIG. 8 (Related Art)
FIG. 8 illustrates a conventional cargo handling system.

(1) First, the wing-body truck 1 is on standby with the wing side panels open in the truck stop area E (S1 in FIG. 7).

(2) Next, the first unmanned carrier 2 receives the cargo W in a shipping area (S2 in FIG. 7) and transports the cargo W to the truck stop area E (S3 in FIG. 7).

(3) Next, the first unmanned carrier 2 moves forward while detecting the distance measurement start point P1 and the distance correction point P2 (S4 in FIG. 7).

(4) Next, when detecting the rear surface 11*a* of the front panel 11, the first unmanned carrier 2 starts decelerating (S5 in FIG. 7).

(5) Next, when detecting the side surface 11*b* of the front panel 11, the first unmanned carrier 2 stops after traveling a predetermined distance (S6 in FIG. 7).

(6) Next, the first unmanned carrier 2 outputs the first distance and transmits the first distance to the management device 3 (S7 in FIG. 7).

(7) The manned carrier 4 picks up the cargo W from the unmanned carrier 2 and loads the cargo W onto the wing-body truck 1 (S8 in FIG. 7); the management device 3 calculates the third distance for the n-th unmanned carrier 2 (S9 in FIG. 7).

(8) The n-th unmanned carrier 2 receives the next cargo W in the shipping area (S10 in FIG. 7) and transports the cargo W to the truck stop area E (S11 in FIG. 7).

(9) If a specified number of times of transportation to the right side of the first cargo bed 10 of the wing-body truck 1 has not been completed (No in S12 in FIG. 7), the management device 3 transmits the third distance to the n-th unmanned carrier 2 (S13 in FIG. 7).

(10) When the n-th unmanned carrier 2 detects the distance measurement start point P1 (S14 in FIG. 7), the n-th unmanned carrier 2 stops after traveling the third distance (S15 in FIG. 7).

(11) The manned carrier 4 picks up the cargo W from the n-th unmanned carrier 2 and loads the cargo W onto the wing-body truck 1 (S8 in FIG. 7).

(12) When the specified number of times of transportation to the right side of the first cargo bed 10 of the wing-body truck 1 is completed (Yes in S12 in FIG. 7), the management device 3 transmits a cargo handling command to the n-th unmanned carrier 2 to transport the cargo W to the opposite side (left side) of the wing-body truck 1, and the n-th unmanned carrier 2 transports the cargo W as the first unmanned carrier 2 on the opposite side (left side) of the wing-body truck 1 (S16 in FIG. 7).

One embodiment according to the cargo handling system and the unmanned carrier of the disclosure has been described above. However, the cargo handling system and the unmanned carrier according to the disclosure are not limited to those defined in the above embodiment. For example, the cargo handling system and the unmanned carrier according to the disclosure may be implemented by the following modifications.

Modifications

- A truck provided in the cargo handling system S is not limited to the wing-body truck 1 if the inner surface 11*a* and the side surface 11*b* of the front panel 11 or the inner surface 12*a* and the side surface 12*b* of the rear panel 12 can be detected by the deceleration sensor 24 and the stop sensor 25.
- In the above embodiment, the wing-body truck 1 stops in the truck stop area E facing the left side. However, when the wing-body truck 1 stops facing the right side, the unmanned carrier 2 may detect the front surface 12*a* and the side surface 12*b* of the rear panel 12 instead of the rear surface 11*a* and the side surface 11*b* of the front panel 11, and decelerate and stop. In this case, the deceleration sensor 24 irradiates a laser obliquely forward in the horizontal direction toward the wing-body truck 1 and detects a distance from the front surface 12*a* of the rear panel 12. In this case, the stop sensor 25 irradiates a laser obliquely rearward in the horizontal direction toward the wing-body truck 1 and detects the side surface 12*b* of the rear panel 12.
- A plurality of unmanned carriers 2 may be configured. Even in this case, there is no change in the facts that the first unmanned carrier 2 detects the front panel 11 or the rear panel 12 and decelerates and stops and that the second and subsequent unmanned carriers 2 stop after traveling the third distance from the distance measurement start point P1.
- The type of the unmanned carrier 2 is not particularly limited. For example, the second cargo bed 22 of the unmanned carrier 2 may not be of a roller type.
- The cargo handling system S may include a forklift type unmanned carrier instead of the manned carrier 4. In the cargo handling system S, since the unmanned carrier 2 is able to stop at a predetermined position regardless of the stop position of the truck, it is possible to load the cargo W onto a predetermined loading position on the first cargo bed 10 simply by causing the forklift type unmanned carrier to move forward a predetermined distance after picking up the cargo W.
- The magnetic bar T, the distance measurement start point P1 and the distance correction point P2 may be, for example, colored tapes. In this case, the point detector 23 may be a detector that optically detects a color tape. The magnetic bar may be composed of a magnetic tape.
- The storage part 30 and the distance calculator 31 may for example be located on the unmanned carrier 2. In this case, the unmanned carrier 2 calculates the third distance by itself.
- The unmanned carrier 2 may transport the cargo W alternately left and right from the head of the first cargo bed 10 of the wing-body truck 1. Even in this case, there is no change in the facts that the first unmanned carrier 2 detects the front panel 11 or the rear panel 12 and decelerates and stops on each of the left and right of the first cargo bed 10 and that the second and subsequent unmanned carriers 2 stop after traveling the third distance from the distance measurement start point P1.

What is claimed is:

1. A cargo handling system comprising:

a truck stop area;

a truck, comprising a first cargo bed and at least one of a front panel and a rear panel, stopping within the truck stop area; and an unmanned carrier, comprising a second cargo bed, a first laser sensor and a travel control part, configured to stop adjacent to the truck, wherein the first laser sensor irradiates a laser obliquely rearward in a horizontal direction toward the truck and detects a side surface of the front panel or a side surface of the rear panel; and the travel control part causes the unmanned carrier to stop in response to detection of the side surface of the front panel or the side surface of the rear panel, wherein the unmanned carrier further comprises a second laser sensor, the second laser sensor irradiates a laser obliquely forward in the horizontal direction toward the truck and detects a distance from a rear surface of the front panel or a distance from a front surface of the rear panel, and in response to the distance between the second laser sensor and the rear surface of the front panel or the front surface of the rear panel reaching a predetermined distance, the travel control part reduces a traveling speed of the unmanned carrier.

2. The cargo handling system according to claim 1, wherein the first laser sensor is arranged in a front portion of the unmanned carrier.

3. The cargo handling system according to claim 1, wherein the unmanned carrier comprises a plurality of the first laser sensors; and each of the first laser sensors is arranged in each of a front portion and a rear portion of the unmanned carrier.

4. The cargo handling system according to claim 1, wherein the truck is a wing-body truck; and the first laser sensor is configured to detect the side surface of the front panel of the wing-body truck.

5. The cargo handling system according to claim 1, further comprising:

a distance measurement start point, arranged laterally adjacent to the truck in a length direction of the truck;

a distance output part, configured to output a distance traveled by the unmanned carrier from a position of the distance measurement start point, outputting a first distance from the position of the distance measurement start point to a position where the side surface of the front panel or the side surface of the rear panel is detected and the unmanned carrier stops;

a storage part, storing a length of cargo to be transported and a predetermined second distance between each cargo; and a distance calculator, based on the first distance, the length of the cargo to be transported and the second distance, calculating a third distance from the position of the distance measurement start point to where the next unmanned carrier stops adjacent to the truck, wherein based on the third distance calculated by the distance calculator and the distance outputted by the distance output part, the travel control part causes the unmanned carrier to stop.

6. An unmanned carrier, used in a cargo handling system comprising a truck stop area and a truck which comprises a first cargo bed and at least one of a front panel and a rear panel and configured to stop within the truck stop area, wherein the unmanned carrier is configured to stop adjacent to the truck, and the unmanned carrier comprises:

a second cargo bed;

a first laser sensor; and a travel control part, wherein the first laser sensor irradiates a laser obliquely rearward in a horizontal direction toward the truck and detects a side surface of the front panel or a side surface of the rear panel; and the travel control part causes the unmanned carrier to stop in response to detection of the side surface of the front panel or the side surface of the rear panel, wherein the unmanned carrier further comprises a second laser sensor, the second laser sensor irradiates a laser obliquely forward in the horizontal direction toward the truck and detects a distance from a rear surface of the front panel or a distance from a front surface of the rear panel, and in response to the distance between the second laser sensor and the rear surface of the front panel or the front surface of the rear panel reaching a predetermined distance, the travel control part reduces a traveling speed of the unmanned carrier.

* * * * *